(12) United States Patent
Tsubaki

(10) Patent No.: US 8,866,922 B2
(45) Date of Patent: Oct. 21, 2014

(54) IMAGE PROCESSING APPARATUS AND CONTROL METHOD THEREOF

(75) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 13/423,870

(22) Filed: Mar. 19, 2012

(65) Prior Publication Data

US 2012/0249830 A1 Oct. 4, 2012

(30) Foreign Application Priority Data

Apr. 1, 2011 (JP) ................................. 2011-082188

(51) Int. Cl.
*H04N 5/235* (2006.01)
*G06T 5/00* (2006.01)
*G06T 5/50* (2006.01)
*H04N 5/355* (2011.01)

(52) U.S. Cl.
CPC . *G06T 5/008* (2013.01); *G06T 5/50* (2013.01); *H04N 5/2353* (2013.01); *H04N 5/2355* (2013.01); *H04N 5/2356* (2013.01); *H04N 5/35572* (2013.01); *G06T 2207/20208* (2013.01); *G06T 2207/10144* (2013.01)
USPC ................... 348/221.1; 348/222.1; 348/229.1

(58) Field of Classification Search
USPC ........................................... 348/221.1–229.1
See application file for complete search history.

(56) References Cited

U.S. PATENT DOCUMENTS

2010/0141789 A1 6/2010 Fossum et al.

FOREIGN PATENT DOCUMENTS

| CN | 1799057 A | 7/2006 |
|---|---|---|
| CN | 101043609 A | 9/2007 |
| JP | 10-243288 | 9/1998 |
| JP | 2002-101347 | 4/2002 |

OTHER PUBLICATIONS

Mikio Takagi, Haruhisa Simoda, Handbook of Image Analysis [Revised Edition], University of Tokyo Press; pg. For section 2-1-1; p. 1652-53p. 1906-9, Sep. 10, 2004.
Kenichi Kanatani, Basic Optimization Mathematics—from Basic Principle to Calculation Method, Kyoritsu Shuppan, Cited in the spec. p. 152-153, Sep. 17, 2005.
J. deLeeuw, "Introduction to Akaike (1973) Information Theory and an Extension of the Maximum Likelihood Principle", Breakthroughs in Statistics Springer Series in Statistics 1992, pp. 599-609.
Tomoyuki Nagahashi et al., "Object Type Classification Using Structure-based Feature Representation", MVA2007: IAPR Conference on Machine Vision Applications, pp. 142-145, May 2007.
Mikio Takagi, Haruhisa Simoda, Handbook of Image Analysis [Revised Edition], University of Tokyo Press; pg. for section 2-1-1; p. 1652-1653; p. 1906-9, Sep. 10, 2004.
Jul. 2, 2014 Chinese Office Action, English Translation, that issued in Chinese Patent Application No. 201210090597.4.

*Primary Examiner* — James Hannett
*Assistant Examiner* — Yih-Sien Kao
(74) *Attorney, Agent, or Firm* — Cowan, Liebowitz & Latman, P.C.

(57) ABSTRACT

After a plurality of differently exposed images are obtained, and tone levels of the plurality of images are adjusted, image elements corresponding to changes of objects are detected based on pixel value differences between the plurality of images. Then, the numbers of blown-out highlight and shadow-detail loss image elements in the image elements corresponding to the changes of the objects are counted for the plurality of images. Then, an image in which the total of the numbers of image elements is smallest is selected. Furthermore, image elements corresponding to the changes of the objects in the selected image are used as those corresponding to image elements corresponding to the changes of the objects in an HDR image to be generated.

17 Claims, 10 Drawing Sheets

$Cnt_a = 15$ $Cnt_b = 10$ $Cnt_a = 15$ $Cnt_b = 10$ $\therefore i_{best} = C$ $Cnt_c = 9$

◯ MOVING IMAGE ELEMENT (OBSERVATION TARGET)

● WHITE, BLOWN-OUT HIGHLIGHT, BLACK, OR SHADOW-DETAIL LOSS IMAGE ELEMENT

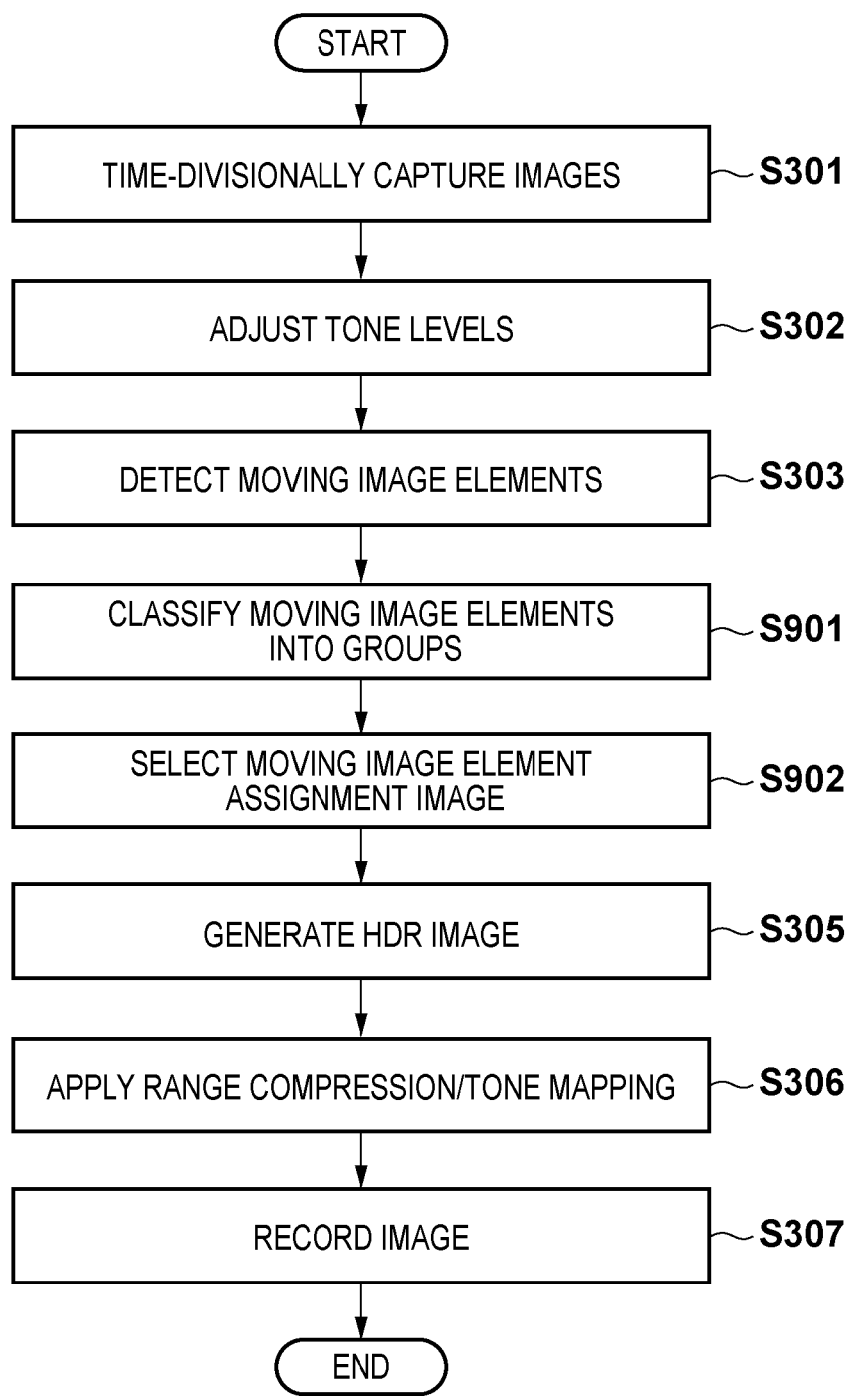

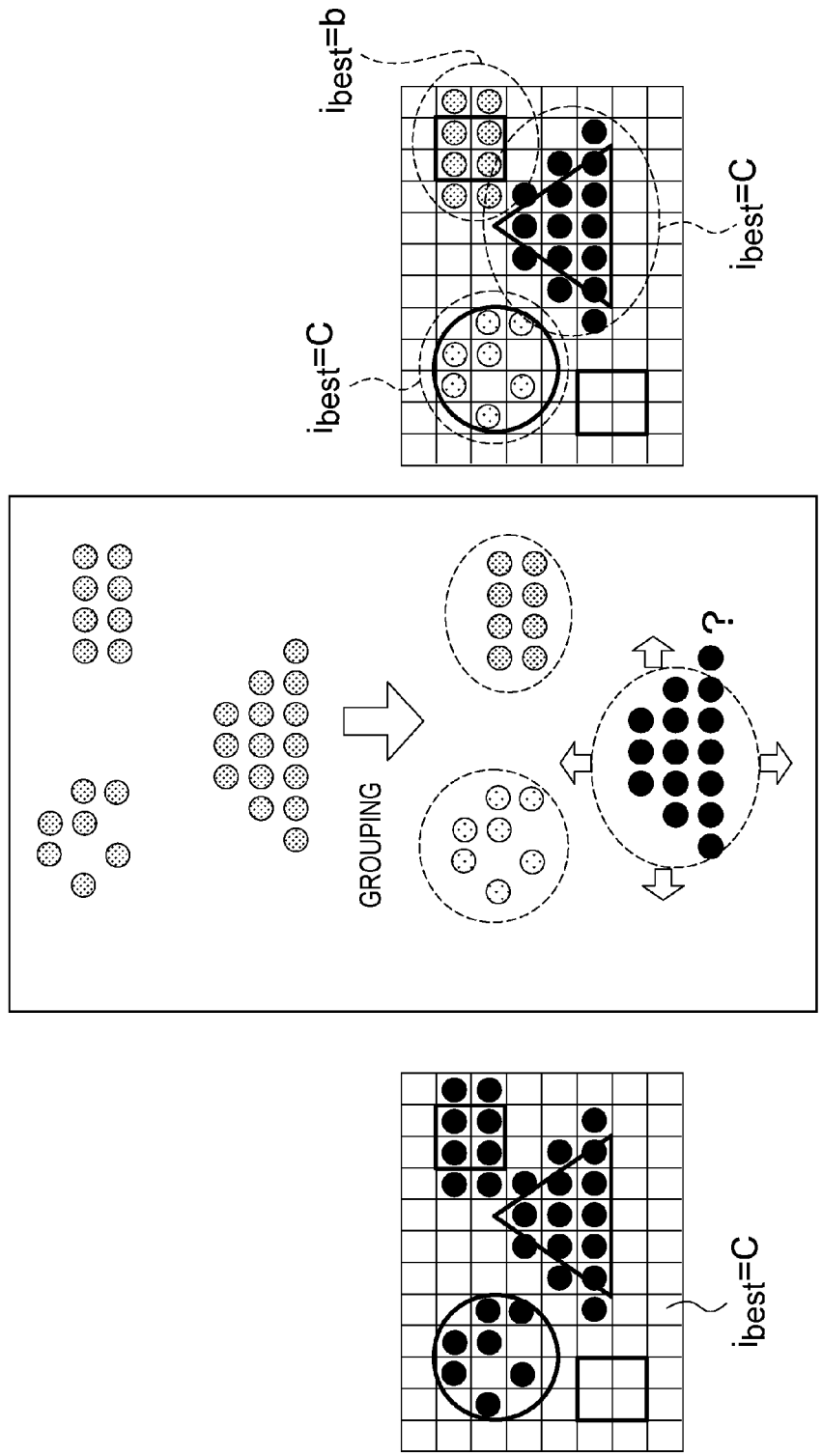

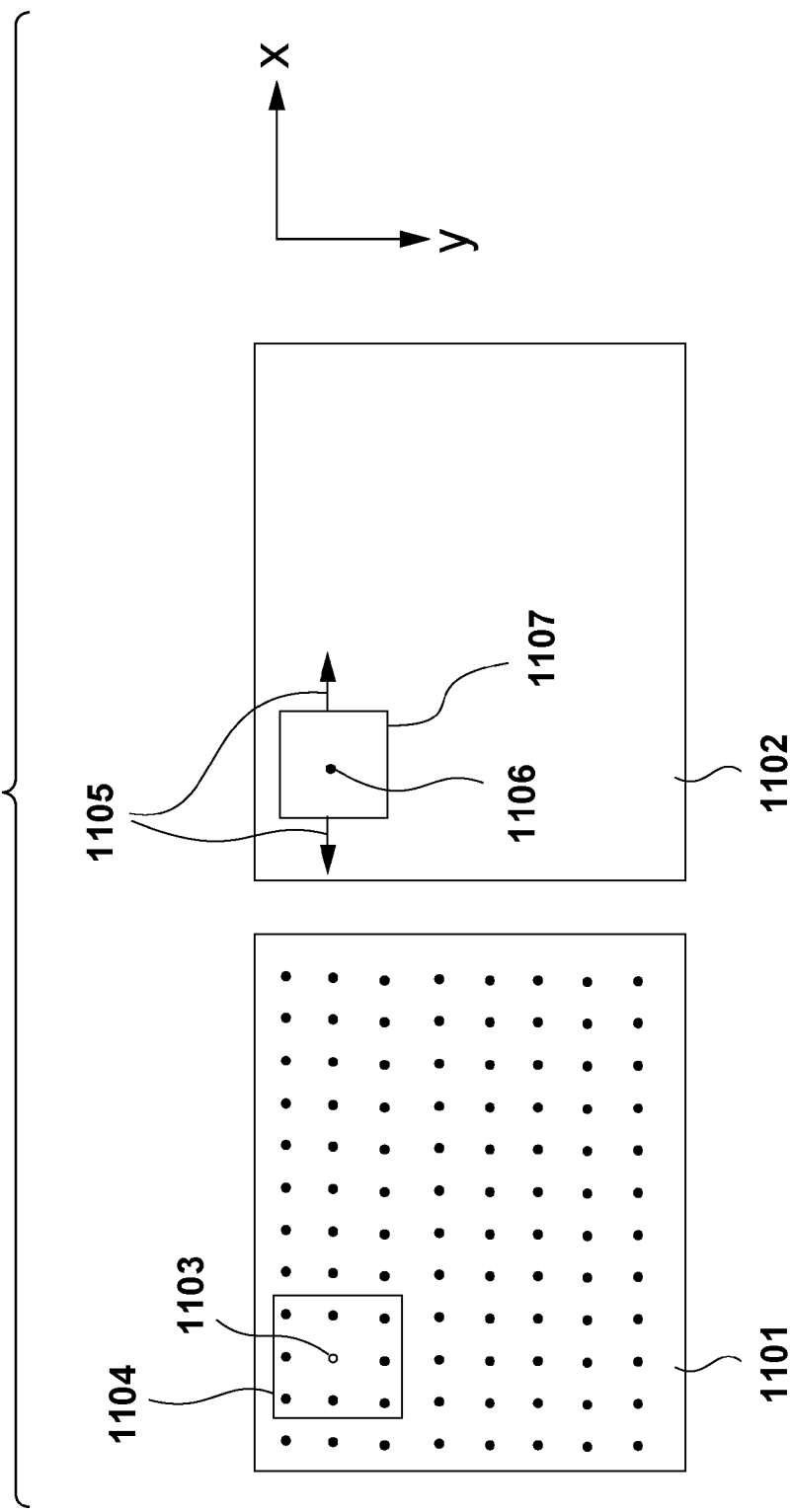

IMAGE PROCESSING APPARATUS AND CONTROL METHOD THEREOF

BACKGROUND OF THE INVENTION

1. Field of the Invention

The present invention relates to a dynamic range extending technique for extending a tone range by compositing a plurality of differently exposed images.

2. Description of the Related Art

In recent years, some of image capturing apparatuses such as digital cameras and digital video cameras have a dynamic range extending function which obtains an image whose tone range is extended by compositing a plurality of differently exposed images, which are obtained by capturing images of an object using different exposure times.

A basic concept of a dynamic range extending technique, that is, a so-called HDR (High Dynamic Range) image generation technique, used in the dynamic range extending function is as follows.

Image elements of a blown-out highlight region in an overexposed image are compensated for from those of images captured to have shorter exposure times than that image.

Image elements of a shadow-detail loss region in an underexposed image are compensated for from those of images captured to have longer exposure times than that image.

In this manner, the tone range of an image can be extended without causing any shadow-detail loss or blown-out highlight. More specifically, respective image elements of an image (HDR image) to be generated, the tone range of which is extended, are generated by executing processing such as replacement to image elements of differently exposed images or a properly exposed image, or weighted averaging of all images used in the processing. Note that differently exposed images are composited by the weighted averaging processing or the like after they are normalized since these images have different tone levels caused by different exposure times.

Generation of an HDR image by such dynamic range extending technique requires a plurality of images to be composited, which are obtained by a plurality of image capturing operations having different exposure levels. However, when objects include a moving object, images to be composited have different moving object regions, an image discontinuity problem occurs in an HDR image obtained by compositing the images to be composited.

More specifically, when object include a moving object, an HDR image obtained by compositing images obtained by a plurality of image capturing operations suffers the following problems associated with image discontinuity. For example, when a case will be assumed wherein a moving object region 201 includes a blown-out highlight region 202 in an overexposed image 200, as shown in FIG. 2, the following problems are posed.

1. When image elements are replaced using those of an underexposed image 220 including no moving object in a region at the same position as the blown-out highlight region 202, a transparent region 231 where a background is seen through is generated in the moving object region of an HDR image 230 (transparency).
2. When image elements are replaced using those of an underexposed image 220 in which a moving object exists in a region at the same position as the blown-out highlight region 202 but its position is different, a texture pattern of a moving object surface becomes discontinuous at a boundary of a corresponding region 232.
3. Unlike in FIG. 2, when an overexposed image includes a blown-out highlight region in a background region, and when a moving image in an underexposed image exists at an occluding position of that region, images are composited by replacement of image elements of the blown-out highlight region to those of the underexposed image as if there were a plurality of images of the moving object (image lag).

Not only image element replacement processing but also composition processing using weighted averaging of a plurality of images in a halftone range also cause image discontinuity such as multiple edges around a moving object and pattern mixture in added moving object regions as problems posed at the time of the conventional image composition processing.

In order to avoid image discontinuity in a composite image output by the HDR image generation processing when a moving object is included, techniques for dynamically controlling image composition in the HDR image generation processing have been disclosed.

Japanese Patent Laid-Open No. 2002-101347 discloses the following technique. That is, when an HDR image is generated using two images, that is, an underexposed image and overexposed image, a region where image discontinuity may occur is specified based on differences between tone levels of normalized images, and replacement to the underexposed image is inhibited in that region.

Japanese Patent Laid-Open No. 10-243288 discloses the following technique. That is, in composition processing by means of weighted averaging of a plurality of images in a halftone range, control is made not to use an image in which motion vectors of a moving object between images to be composited are equal to or larger than a threshold in the composition processing, thus avoiding multiple edges and pattern mixture.

However, the method of Japanese Patent Laid-Open No. 2002-101347 above has been proposed under the assumption of a case in which an image of a region (blown-out highlight region) having tone levels equal to or larger than a threshold in the overexposed image is replaced by the underexposed image, and does not consider any case in which the underexposed image includes a shadow-detail loss region. That is, the aforementioned technique of Japanese Patent Laid-Open No. 2002-101347 eliminates image discontinuity in a blown-out highlight region, but it cannot simultaneously eliminate image discontinuity in all of a blown-out highlight region, halftone region, and shadow-detail loss region.

Since the method of Japanese Patent Laid-Open No. 2002-101347 assumes only the case in which two differently exposed images are to be composited, it is not applicable to composition of three or more images.

Furthermore, the method of Japanese Patent Laid-Open No. 10-243288 avoids image discontinuity in a halftone region. However, since this method requires hardware or processes for detecting motion vectors, other problems about an increase in circuit scale, that in processing time associated with calculations, and so forth may be posed.

SUMMARY OF THE INVENTION

The present invention has been made in consideration of the problems of the conventional techniques. The present invention provides a technique which avoids image discontinuity in composition of a blown-out highlight region, halftone region, and shadow-detail loss region when a tone range is extended by compositing a plurality of differently exposed images.

The present invention in its first aspect provides an image processing apparatus, which comprises a generation unit configured to generate a composite image whose dynamic range is extended using a plurality of differently exposed images, comprising: an obtaining unit configured to obtain the plurality of differently exposed images; a detection unit configured to detect changes of image element values between the plurality of images; a count unit configured to count first image elements of which image element values are larger than a first threshold and second image elements of which image element values are smaller than a second threshold, in a region in which the changes are detected, in each of the plurality of images; and a selection unit configured to select one of the plurality of images based on a count result of the count unit, wherein the generation unit uses the image selected by the selection unit for a region, corresponding to the region where the changes are detected, in the composite image.

Further features of the present invention will become apparent from the following description of exemplary embodiments (with reference to the attached drawings).

BRIEF DESCRIPTION OF THE DRAWINGS

FIG. 9 is a flowchart of HDR image generation processing according to the second embodiment of the present invention;

FIGS. 10A, 10B, and 10C are views for explaining grouping processing of moving image elements according to the second embodiment of the present invention; and FIG. 11 is a view for explaining motion vector detection by template matching according to the first modification of the present invention.

DESCRIPTION OF THE EMBODIMENTS (First Embodiment)

A preferred embodiment of the present invention will be described in detail hereinafter with reference to the drawings. An embodiment to be described below will exemplify a case in which the present invention is applied to a digital camera, as an example of an image processing apparatus, which can output an image whose dynamic range is extended (HDR image) by compositing a plurality of images obtained by capturing images of an object to have different exposure times. However, the present invention is applicable to an arbitrary apparatus, which can output an image whose dynamic range is extended by compositing a plurality of images obtained by capturing images of an object to have different exposure times. In this specification, "image discontinuity" will generically express the aforementioned problems about transparency, texture discontinuity, image lag, multiple edges, and pattern mixture in an HDR image.

(Functional Arrangement of Digital Camera)

Figure 1:
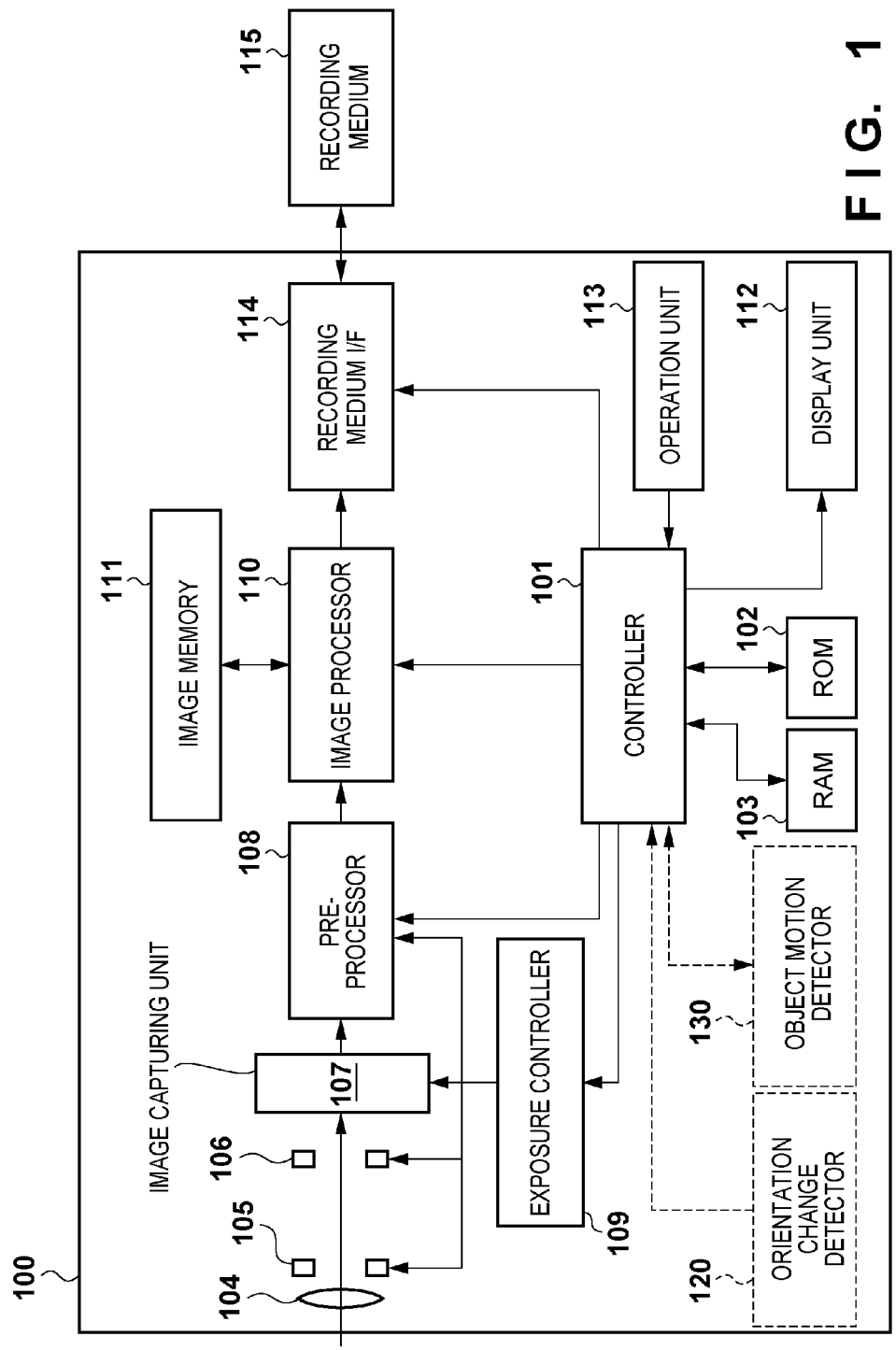
FIG. 1 is a block diagram showing the functional arrangement of a digital camera 100 according to an embodiment of the present invention.
Figure 2:
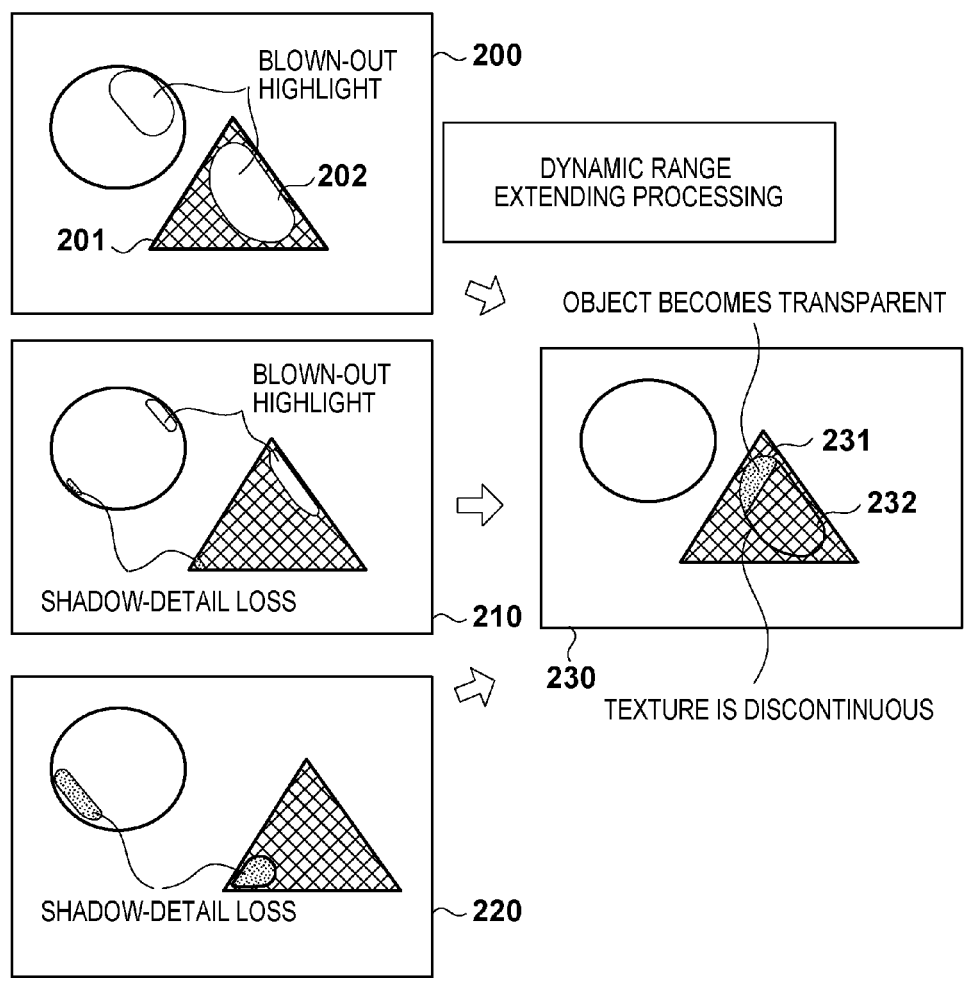
FIG. 2 is a view for explaining image discontinuity in an HDR image, which is caused by the conventional dynamic range extending processing.

FIG. 1 is a block diagram showing the functional arrangement of a digital camera 100 according to an embodiment of the present invention.

A controller 101 is, for example, a CPU. The controller 101 controls operations of respective blocks included in the digital camera 100 by reading out an HDR image generation processing program (to be described later), which is stored in a ROM 102, expanding the readout program on a RAM 103, and executing the expanded program. The ROM 102 is, for example, a register such as a rewritable nonvolatile memory. The ROM 102 stores information of control parameters and the like required for the operations of the respective blocks included in the digital camera 100 in addition to the HDR image generation processing program. The RAM 103 is, for example, a volatile memory. The RAM 103 is used not only as the expansion region of the HDR image generation processing program, but also as a temporary storage area of intermediate data output during the operations of the respective blocks included in the digital camera 100.

Note that in the following description, respective processes are implemented by the respective blocks included in the digital camera 100 as hardware components. However, the present invention is not limited to such specific embodiment, and the processes of the respective blocks may be implemented by programs which can implement the same processes as those of the respective blocks.

An aperture 105 is an exposure control element, which is disposed on a pupil plane of an optical system 104 and adjusts a light amount by partially intercepting light that enters a surface of an image capturing unit 107. A mechanical shutter 106 is an exposure control element, which adjusts a temporally entering light amount by physically intercepting rays that enter the surface of the image capturing unit 107.

The image capturing unit 107 is configured by an image capturing element, that is, a single plane element which is formed by laying color filters in, for example, a Bayer array pattern, and receives an object image by a single plane, a three-plane element which separates color information into three or more using a spectral prism (not shown), and receives respective light rays by independent image capturing elements, or the like. The image capturing unit 107 photoelectrically converts an object image formed via the optical system 104 which includes a plurality of lenses and mirrors. Then, the image capturing unit 107 outputs an analog image signal obtained by photoelectric conversion to a pre-processor 108.

Note that when the image capturing unit 107 is configured by the three-plane element, it requires a spectral optical element, but Bayer array interpolation processing in an image processor 110 (to be described later) can be omitted. Also, the image capturing unit 107 is also an exposure control element which adjusts a light amount by controlling accumulation times and read timings of image capturing elements, since the image capturing elements have an electronic shutter function.

The pre-processor 108 applies, to the input analog image signal, noise removal by means of correlated double sampling (CDS), exposure control using gain adjustment by means of auto gain control (AGC), black level correction, and A/D conversion processing, and outputs a digital image signal. Various processes executed in the pre-processor 108 are also called AEF (analog frontend) processes since they are pre-processes for the analog image signal.

In this embodiment, in order to time-divisionally capture a plurality of differently exposed images, the controller 101 controls exposure control operations in the aperture 105, mechanical shutter 106, image capturing unit 107, and pre-processor 108 using an exposure controller 109. More specifically, the exposure controller 109 controls an aperture value of the aperture 105, open time of the mechanical shutter 106, accumulation times and read timings of the image capturing elements, and a gain adjustment amount in the pre-processor 108 in accordance with pieces of exposure information of a plurality of images input from the controller 101.

The image processor 110 applies, to the input digital image signal, image processes such as Bayer array interpolation, linear matrix processing, white balance adjustment, YCC conversion, color difference/tone/contrast correction, and edge emphasis processing. The image processor 110 can generate one output image (an image associated with a single normal image capturing operation) by applying these image processes. The generated image is stored in, for example, an image memory 111 (to be described later). Alternatively, the generated image is recorded in a recording medium 115 via a recording medium I/F unit 114. Various image processes executed by the image processor 110 are called DBE (digital backend) processes, contrary to the AFE processes of the pre-processor.

In this embodiment, assume that the image processor 110 executes image processing including composition processing, which is executed in respective steps required to generate an HDR image whose dynamic range is extended from a plurality of differently exposed images. The plurality of differently exposed images used in the HDR image generation processing are sequentially stored in the image memory 111 after application of the DBE processes in the image processor 110. The image processor 110 reads out respective images from the image memory 111, and applies the required processes to them.

Also, when conversion processing such as compression encoding is required according to a recording format of a captured image, which is stored in, for example, the ROM 102, the image processor 110 applies that processing to image data, thus generating image data to be recorded.

The image memory 111 is an image storage area included in the digital camera 100. The image memory 111 may temporarily store not only image data obtained by the HDR image generation processing, but also intermediate image data, which is obtained by applying some of the DBE processes, as needed. Images stored in the image memory 111 may be RAW image data of three planes, to which, for example, Bayer array interpolation and linear matrix processing have been applied, RGB image data which have further undergone white balance adjustment, or YCC image data to which YCC conversion has been applied. Note that this embodiment will give the following description under the assumption that images for the HDR image generation processing, which are stored in the image memory 111, are YCC images. However, images used in the HDR image generation processing (to be described later) are not limited to those on a YCC color space, but images on other color spaces may be used.

A display unit 112 is, for example, a display device such as a compact LCD, which is included in the digital camera 100, and displays a captured image, generated HDR image, or image read out from the recording medium 115 via the recording medium I/F unit 114 (to be described later).

An operation unit 113 is a user interface, which includes a shutter button, menu button, and the like included in the digital camera 100, and is used to accept operation inputs from the user. The operation unit 113 analyzes an operation input made by the user, and outputs a signal corresponding to that operation input to the controller 101. Also, the operation unit 113 is not limited to physical operation members (the aforementioned shutter button, menu button, and the like), but it may include a touch panel sensor. In this case, the operation unit 113 outputs information of a position on a display region of the display unit 112 operated by the user to the controller 101.

The recording medium I/F unit 114 is an interface used to, for example, write image data and the like generated by the image processor 110 in the connected recording medium 115 or to read out data from the recording medium 115. The recording medium 115 may be, for example, an internal memory included in the digital camera 100, or a recording device such as a memory card or HDD, which is detachably connected to the digital camera 100.

(HDR Image Generation Processing)

Figure 3:
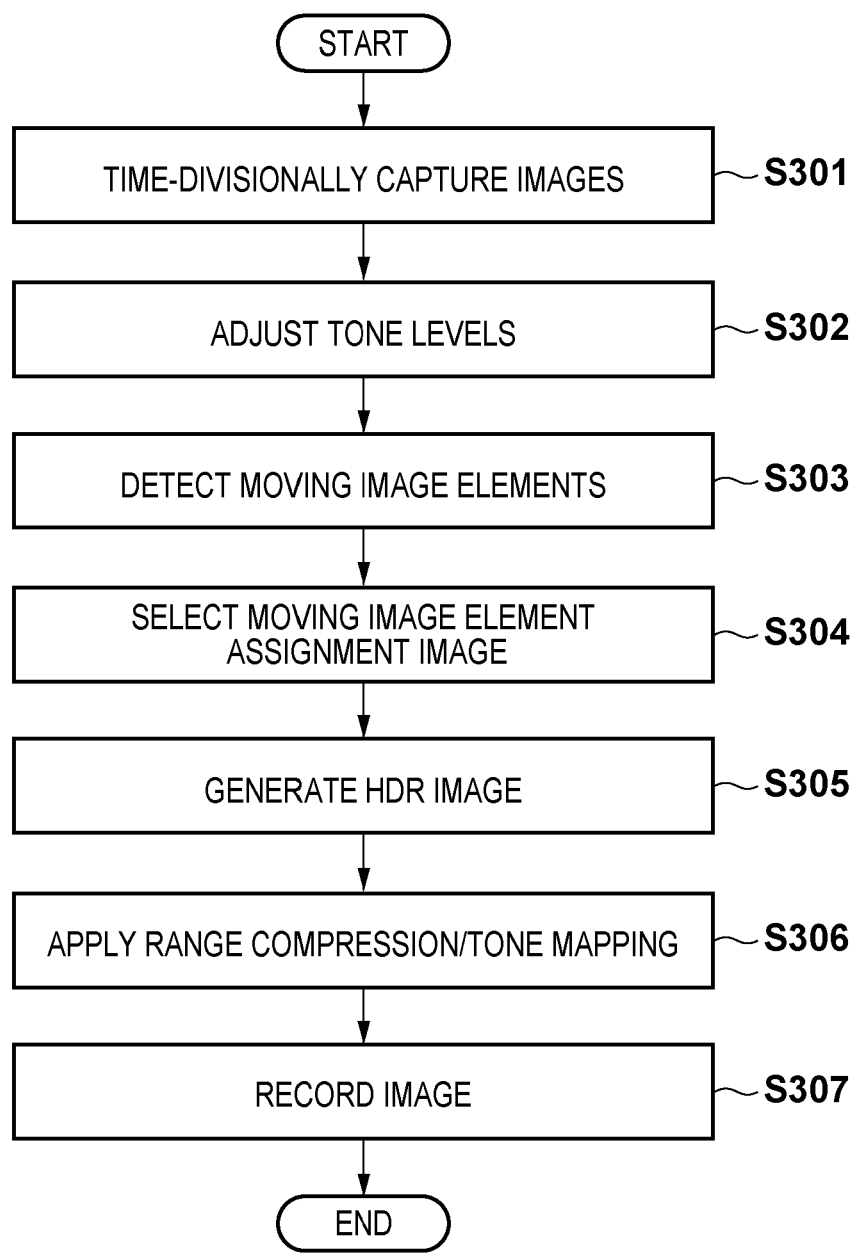
FIG. 3 is a flowchart of HDR image generation processing according to the first embodiment of the present invention.

The HDR image generation processing of the digital camera 100 of this embodiment with the aforementioned arrangement will be practically described below with reference to the flowchart shown in FIG. 3. The processing corresponding to this flowchart can be implemented when the controller 101 reads out a corresponding processing program stored in, for example, the ROM 102, expands the readout program onto the RAM 103, and executes the expanded program. Note that the following description will be given under the assumption that this HDR image generation processing is started, for example, when the user operates the shutter button while an image capturing mode of the digital camera 100 is set in an HDR image capturing mode.

In step S301, the controller 101 decides the number of images required to composite an HDR image, and exposure amounts of these images. The controller 101 controls the exposure controller 109 to control the aperture 105, mechanical shutter 106, image capturing unit 107, and pre-processor 108, thus obtaining a plurality of time-divisionally captured images. Information of the number of images required to composite an HDR image and of the exposure amounts of the respective images may be set and stored in advance in, for example, the ROM 102, or may be decided according to a result of photometry processing of an object. Note that the plurality of differently exposed images, which are obtained by the time-divisional image capturing operations, are converted into images of the YCC format after they undergo predetermined processes in the pre-processor 108 and image processor 110. Then, the converted images are stored in the image memory 111.

Figure 4:
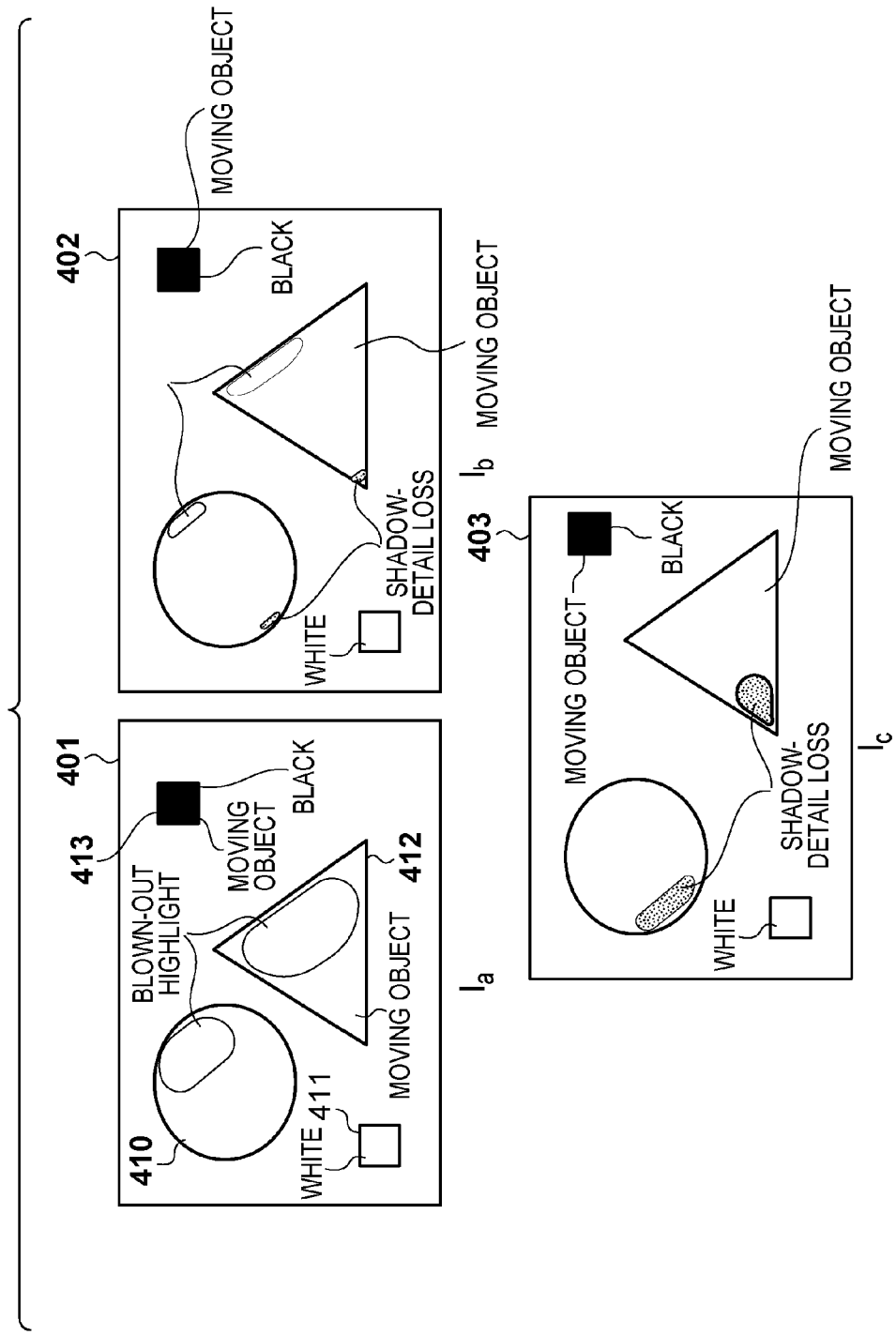
FIG. 4 shows an example of a plurality of differently exposed images according to the embodiment of the present invention.

Note that this embodiment will explain a case in which an HDR image is composited using three differently exposed images 401, 402, and 403, as shown in FIG. 4, for the sake of simplicity. However, the present invention is not limited to such specific embodiment, and is applicable to composition using two or more differently exposed images. Assume that the exposure amounts of the images 401 to 403 are decreased in the order named, and these images are time-serially captured in the same order. In the following description, these images will be referred to as an overexposed image 401, middle-exposed image 402, and underexposed image 403. Each image includes, as objects, still objects 410 and 411 and moving objects 412 and 413. During image capturing operations of the plurality of images, the moving objects 412 and 413 are moving in the right direction with respect to the digital camera 100.

When the digital camera 100 includes a registration function similar to an optical or electronic anti-vibration function, this function is applied to the plurality of differently exposed images obtained in step S301.

In step S302, the controller 101 controls the image processor 110 to execute tone level adjustment processing so as to align image element values associated with identical objects among the plurality of images stored in the image memory 111. More specifically, the image processor 110 multiplies each of the plurality of images stored in the image memory 111 by a reciprocal of a ratio of an exposure time of that image with reference to the longest exposure time of an image, thus attaining tone level adjustment. Note that the controller 101 controls the image processor 110 to output and store the level-adjusted images in the image memory 111.

Figure 5:
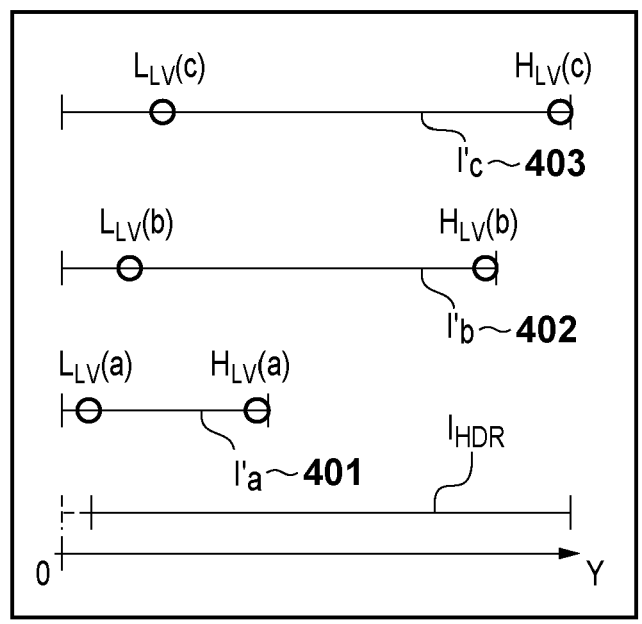
FIG. 5 is a view for explaining a tone range after tone level adjustment due to different exposure times.

FIG. 5 shows tone ranges of the respective images after the tone level adjustment, and a tone range which can be expressed by an HDR image generated using the plurality of images. In FIG. 5, image element values of luminance Y components of an image are used as a tone range. Also, in the respective level-adjusted images, a blown-out highlight luminance threshold $H_{LV}$ and shadow-detail loss luminance threshold $L_{LV}$ are expressed using reference symbols: a corresponds to the overexposed image 401; b, the middle-exposed image 402, and c, the underexposed image 403.

Note that in this embodiment, an image element value indicates tone data of an image element. When an image element is a chromatic image element, the image element value is expressed by a vector having elements as many as the number of components of a color space. That is, a value of a specific component on a color space such as a luminance value expresses a scalar amount.

In step S303, the controller 101 detects image elements (moving image elements) that correspond to changes of the objects in the plurality of level-adjusted images stored in the image memory 111, that is, those corresponding to regions including the moving objects and changes of shadow-detail loss or blown-out highlight states. More specifically, the controller 101 reads out two out of the plurality of level-adjusted images stored in the image memory 111, and calculates a difference between image element values associated with an image element at the same coordinate position. Then, when the difference between the image element values is equal to or larger than a predetermined threshold, the controller 101 detects that image element as a moving image element.

For example, when differences of luminance values are calculated for the middle-exposed image 402 and underexposed image 403 with reference to the level-adjusted overexposed image 401, a Boolean type variable $B_{MOV}$ indicating whether or not image elements of the three images are moving image elements is judged by a Boolean expression given by:

$$B_{MOV} = F(Y_b - Y_a) \vee F(Y_c - Y_a)$$

where F is a function required to judge whether or not a difference ΔY between luminance values of image elements exceeds a threshold $Th_{MOV}$ which is predetermined to judge whether or not these image elements are moving image elements, and is expressed $$F(\Delta Y) = \begin{cases} 0 & (|\Delta Y| < Th_{MOV}) \\ 1 & (|\Delta Y| \geq Th_{MOV}) \end{cases}$$

Note that this embodiment will give the following description under the assumption that moving image elements are detected using luminance components of image element values of YCC images stored in the image memory 111. However, the present invention is not limited to such specific embodiment. For example, when images stored in the image memory 111 are RGB images or RAW images, whether or not an image element is a moving image element may be judged using absolute values of vectors each indicating respective color components that configure each image element value or specific color components. Furthermore, the controller 101 may obtain values by which the neighbor image element's movement is considered, such as SAD (Sum of Absolute Difference), SSD (Sum of Squared Difference), and brightness gradient (Optical Flow), and detect the moving image element by calculating the motion vector or the affine coefficient of a region's geometrical deformation based on these values, and not by means of the difference between image element values. In addition, the controller 101 may detect the moving image element in view of a history of an image element's movement by using for example the Kalman filter or the Bayes' estimation.

Also, this embodiment will give the following description under the assumption that three images are used to composite an HDR image. When composition processing is executed using images other than three images, Boolean expression changes depending on the number of images. Whether or not image elements at the same coordinate position are moving image elements is judged while requiring at least (the number of images used in composition)−1 difference calculations. The number of terms of the Boolean expression is equal to the number of difference calculations, and a Boolean expression in which all terms are combined under OR conditions can be used in place of expression. Note that this embodiment will give the following description under the assumption that the Boolean expression is judged by calculating, with reference to one image, differences of luminance values between that image and another image. However, the present invention may be applied to an arrangement in which differences of luminance values between two time-serially continuous images are calculated without setting any standard image.

Figure 6:
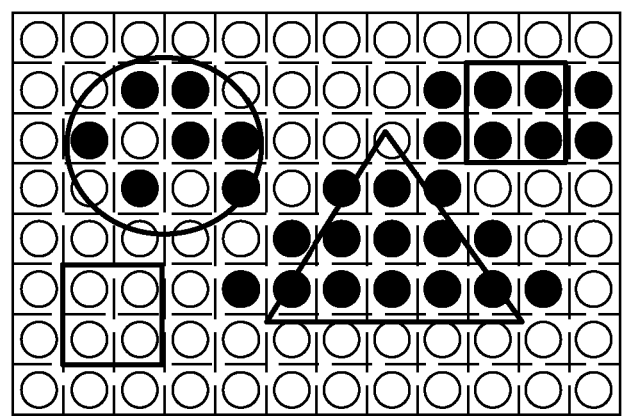
FIG. 6 shows detected moving image elements according to the embodiment of the present invention.

After moving image elements are detected among the overexposed image 401, middle-exposed image 402, and underexposed image 403 shown in FIG. 4, the respective image elements of the image are classified, as shown in, for example, FIG. 6. In FIG. 6, a moving image element is indicated by a filled circle, and an image element which does not correspond to a moving image element is indicated by an open circle.

In step S304, the controller 101 selects an image, from which image elements are to be extracted as those corresponding to the moving image elements detected in step S303 at the time of composition of an HDR image, from the plurality of level-adjusted images stored in the image memory 111. More specifically, the controller 101 reads out the plurality of differently exposed images after the level adjustment, which are stored in the image memory 111. Then, for image elements of the respective images, which are determined as moving image elements, the controller 101 counts the numbers of image elements having luminance values which exceed the threshold of blown-out highlight image element values or which fall below that of shadow-detail loss image element values, which thresholds are set in the respective images, that is, the numbers of blown-out highlight and shadow-detail loss image elements. After counting, the controller 101 selects an image, in which a total of the numbers of blown-out highlight and shadow-detail loss image elements of the moving image elements is smallest, of the plurality of level-adjusted images stored in the image memory 111, as an image used as image elements corresponding to the moving image elements of an HDR image.

An image, in which the total of the numbers of blown-out highlight and shadow-detail loss image elements of the moving image elements is the smallest, can be selected from the plurality of differently exposed images using, for example:

$$i_{best} = \operatorname{argmin}_i \left( \sum_{x=dyn\_corr} f_i(\vec{x}) \right) \quad [1]$$

where x is a moving image element (dyn_corr), $\vec{x}$ is a coordinate position of that moving image element, and i is an identifier (a, b, c, . . . ) used to identify the plurality of differently exposed images. Also, $f_i(\vec{z})$ is a Boolean type variable indicating whether or not an image element at i in an image with the identifier i is a blown-out highlight or shadow-detail loss image element, and is defined by:

$$f_i(\vec{x}) = \begin{cases} 1: \vec{I}_i(\vec{x}) > \vec{H}_{LV}(i) \vee \vec{I}(\vec{x}) > \vec{L}_{LV}(i) \\ 0: \vec{L}_{LV}(i) \leq \vec{I}_i(\vec{x}) \leq \vec{H}_{LV}(i) \end{cases}$$

where $\vec{I}(\vec{x})$ is an image element value of an image element at $\vec{x}$ in an image with the identifier i, and $\vec{H}_{LV}$ and $\vec{L}_{LV}$ respectively indicate the threshold of blown-out highlight image element values and that of shadow-detail loss image element values in an image with the identifier i. Note that in comparison between vectors at this time, when all color component values of one image element value vector exceed those of the other vector, it is judged that the former image element value vector is larger. Conversely, when all color component values of one image element vector fall below those of the other vector, it is judged that the former image element value vector is smaller.

That is, equation [1] counts the numbers of blown-out highlight and shadow-detail loss image elements of moving image elements respectively for the plurality of differently exposed images, and returns an identifier of an image having the smallest total. Note that this embodiment will give the following description under the assumption that blown-out highlight and shadow-detail loss image elements are determined using luminance values in the plurality of level-adjusted images. However, the determination method of blown-out highlight and shadow-detail loss image elements may use vectors each including, as elements, color components as image element values, as given by equation [1], in place of luminance values.

Figure 7A:
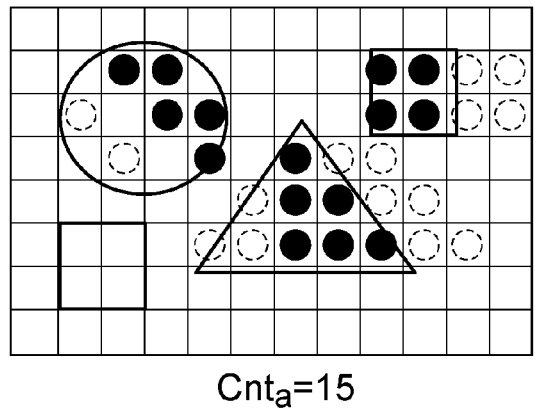
FIGS. 7A, 7B, and 7C are views showing blown-out highlight and shadow-detail loss image elements in moving image elements of a plurality of differently exposed images according to the embodiment of the present invention.
Figure 7B:
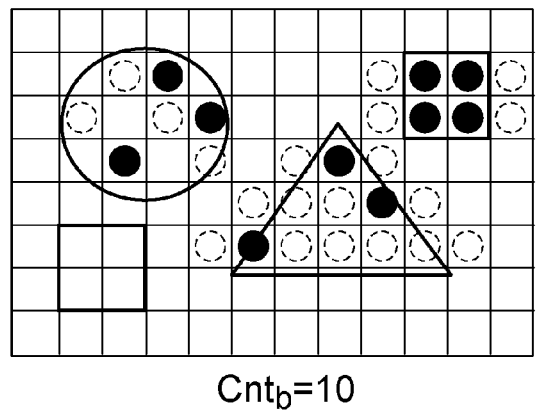
Figure 7C:
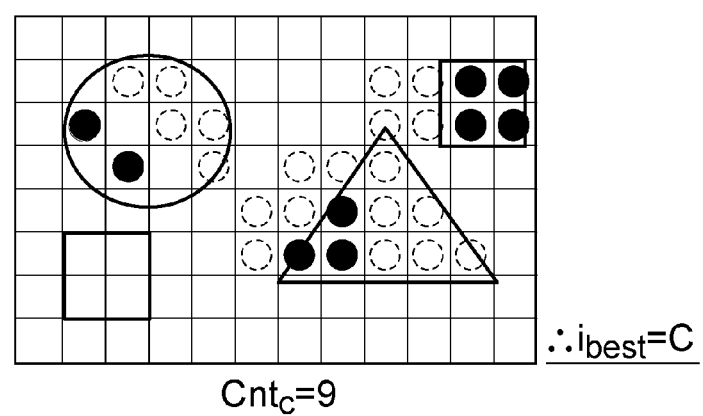

For example, the overexposed image 401, middle-exposed image 402, and underexposed image 403 shown in FIG. 4 respectively have distributions of blown-out highlight and shadow-detail loss image elements in moving image elements, as shown in FIGS. 7A, 7B, and 7C. At this time, the underexposed image 403 in which the total of the numbers of the blown-out highlight and shadow-detail loss image elements is smallest is selected as an image used for moving image elements of an HDR image.

In this embodiment, in order to avoid the problems about image discontinuity caused by executing image composition by means of weighted averaging or image element replacement, image elements corresponding to moving image elements in an HDR image are configured by only those obtained from one image. That is, regions corresponding to changes of objects among the plurality of differently exposed images are fully configured by image elements of one of the plurality of differently exposed images in place of composition by means of weighted averaging or replacement of some image elements in generation of an HDR image. As an image, which is selected at that time and from which all image elements of these regions are extracted, an image in which the total of the numbers of blown-out highlight and shadow-detail loss image elements is smallest is selected from the plurality of differently exposed images. In this manner, an HDR image in which objects of changed regions are reproduced by the broadest tone range can be generated while avoiding image discontinuity.

Note that this embodiment has explained the case in which the numbers of blown-out highlight and shadow-detail loss image elements are counted using the thresholds of blown-out highlight and shadow-detail loss image element values for each of the plurality of level-adjusted images. However, with this method, image elements of a moving object which expresses simple black or white are counted as blown-out highlight or shadow-detail loss image elements. However, since the plurality of differently exposed images are time-divisionally captured within a short period of time, their luminance values remain unchanged. That is, image element values of that moving object remain unchanged, a moving amount of that moving object is small, and influences of object blurs depending on exposure times are small. For this reason, the number of image elements of a moving object which expresses black or white can be constant among the plurality of differently exposed images, and it is easily imagined that an image in which the total of the numbers of blown-out highlight and shadow-detail loss image elements is smallest can be selected even using the aforementioned method.

In this step, when a plurality of images are selected as an image in which the total of the numbers of blown-out highlight and shadow-detail loss image elements is smallest, or when there are images in each of which a difference between the total of the numbers of corresponding image elements and the smallest value falls within a predetermined threshold range, an image to be selected may be decided as follows. For example, since an overexposed image is more likely to be an image having a relatively high S/N ratio, an image with the highest exposure level may be selected from the plurality of corresponding images. That is, according to the embodiment of the present invention, an image in which the total of the numbers of blown-out highlight and shadow-detail loss image elements is smallest or an image with the highest exposure level of those in each of which the difference between the total of the numbers of image elements and the smallest value falls within the threshold range is selected from the plurality of level-adjusted images. Then, image elements corresponding to changes of the objects in the selected image are used as those which correspond to image elements corresponding to the changes of the objects in an HDR image to be generated. Furthermore, using a determination formula in which the number of shadow-detail loss image elements and the number of blown-out highlight image elements are multiplied by different weighting coefficients, an image to be selected may be decided to obtain a desired tone range of a photographer.

In step S305, the controller 101 controls the image processor 110 to generate an HDR image whose dynamic range is extended. More specifically, the controller 101 transfers information of the moving image elements detected in step S303 to the image processor 110, and controls the image processor 110 to generate an HDR image by switching processes in correspondence with the moving image elements and other image elements. The image processor 110 generates image element values of respective image elements of an HDR image to be generated according to the input information of the moving image elements as follows.

As for each image element determined as a moving image element, the image processor 110 substitutes intact, in the moving image element, an image element value at the same coordinate position in the image, which is selected in step S304 and in which the total of the numbers of blown-out highlight and shadow-detail loss image elements is smallest.

As for image elements other than the moving image elements, the image processor 110 may substitute image element values of any image since these image elements are not determined as moving image elements in step S303, that is, changes of these image element values fall within the threshold range in all of the plurality of differently exposed images. Note that when each image capturing element has a poor performance or when the pre-processor 108 is susceptible to electricity, noise may be mixed in image element values. For this reason, image elements other than the moving image elements may be weighted average values of image element values of all or some of the differently exposed images. The underexposed image is multiplied by a relatively large gain in the level adjustment processing, and is susceptible to noise and quantization errors due to finiteness of tone levels of A/D conversion. For this reason, for example, in weighted averaging, smaller weighting coefficients can be set for the underexposed image.

Assume that the HDR image generated by the image processor 110 in this step is stored in the image memory 111.

In step S306, the controller 101 controls the image processor 110 to apply tone mapping processing or range compression processing to the HDR image generated in step S305, thus generating an HDR image to be finally output.

Note that the range compression processing is that required to match a bit depth when an output image is larger than a desired bit depth.

The tone mapping processing is correction processing required to attain desired tone expression by, for example, raising tone levels of a dark region in an image and compressing tone levels of a bright region. In generation of the HDR image, it is effective to apply the tone mapping processing so as to obscure blown-out highlight and shadow-detail loss tone image elements which remain after the HDR processing.

In this embodiment, image element values of one exposed image are assigned to image elements detected as moving image elements upon generation of an HDR image. For this reason, the tone mapping processing can be applied so that blown-out highlight and shadow-detail loss image elements of that exposed image approach a maximum or minimum value of the tone expression. In this manner, in the HDR image to be finally output, blown-out highlight and shadow-detail loss image elements can be obscured.

Also, upon generation of an HDR image, different tone conversion curves used in mapping by the tone mapping processing may be used in accordance with the numbers of blown-out highlight and shadow-detail loss image elements included in the exposed image, whose image elements are assigned to those detected as moving image elements.

Figure 8:
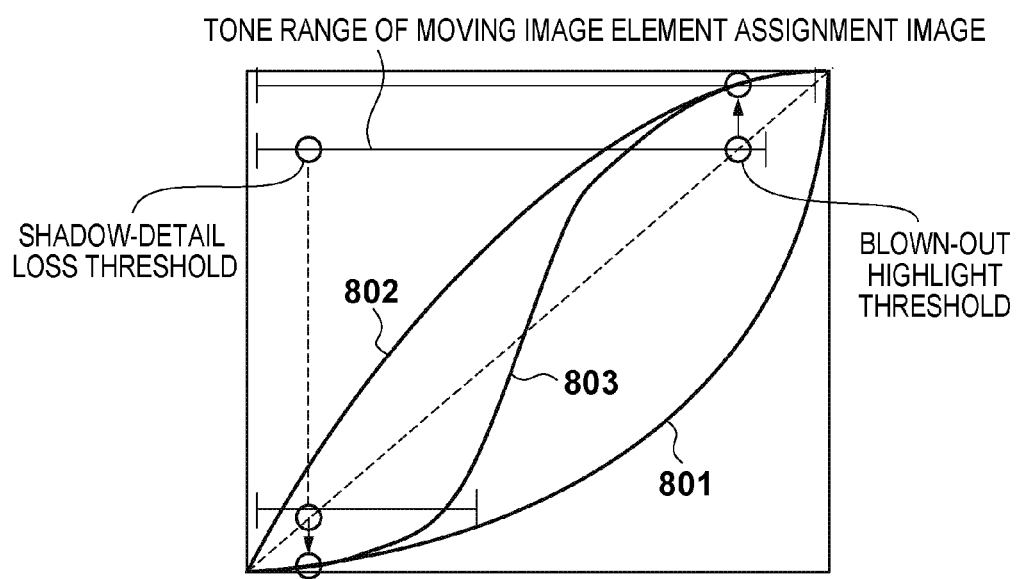
FIG. 8 is a view for explaining tone mapping processing according to the embodiment of the present invention.

For example, upon generation of an HDR image, when the number of shadow-detail loss image elements is larger than that of blown-out highlight image elements in the exposed image to be assigned to image elements detected as moving image elements, processing can be done to map these image elements on a conversion curve 801 shown in FIG. 8. In FIG. 8, the abscissa plots tone vales of an image which is to undergo tone mapping, and the ordinate plots tone values after the tone mapping. These axes express higher tone levels in the right direction or upper direction. In FIG. 8, a broken line shown on a diagonal line expresses a tone conversion curve used when tone correction by means of tone mapping is to be skipped. That is, the conversion curve 801 is designed to get tone values of shadow-detail loss image elements closer to the low tonal end, and to extend tone expression widths of image elements equal to or higher than shadow-detail loss tones, so as to obscure shadow-detail loss image elements in the exposed image.

Conversely, when the number of blown-out highlight image elements is larger than that of shadow-detail loss image elements in the exposed image, these image elements are mapped on a conversion curve 802. When an object has a broad dynamic range, and when the exposed image include both shadow-detail loss and blown-out highlight image elements at similar ratios, a conversion curve 803 is used. Thus, since tone values of shadow-detail loss image elements are got closer to the low tonal end, and those of blown-out highlight image elements are got closer to the high tonal end, a halftone expression range can be broadened, and the shadow-detail loss and blown-out highlight image elements can be obscured.

In this manner, by dynamically changing the tone conversion curves to be applied in the tone mapping processing, shadow-detail loss and blown-out highlight image elements can be obscured in the HDR image to be finally output.

The processing of this step need not be executed when the bit depth of the HDR image generated in step S305 is the same as that of the HDR image to be finally output, or when tone characteristics have already exhibited desired characteristics.

In step S307, the controller 101 controls the image processor 110 to apply predetermined encoding processing to the HDR image to be finally output so as to convert that image into a predetermined recording format, and to output and record the processed image in the recording medium 115 via the recording medium I/F unit 114, thus ending this processing. Also, when exposure control information such as a focal length and aperture value is recorded as metadata simultaneously with the HDR image, the controller 101 obtains required image capturing setting information and state information, and records them in the recording medium 115.

Note that this embodiment has explained the case in which the HDR image to be finally output is recorded. However, when image processes such as tone/color/contrast correction and edge emphasis are further applied to the HDR image, that HDR image may be stored in the image memory 111.

This embodiment has explained the case in which an HDR image is generated using a plurality of images like those which are captured using a tripod, and in which positions of still objects in an image, which are included in a scene to be captured, are left unchanged. However, the present invention is not limited to this. When the positions of the still objects in a captured image, which are included in the scene to be captured, change due to the influence of, for example, a camera shake, position alignment between images is executed by a known method, and image elements corresponding to changes of objects may then be judged.

This embodiment has explained the case in which the plurality of differently exposed images, which are captured time-divisionally, are used. However, the present invention is also applicable to a case in which an HDR image is generated using images of the same scene to be captured (for example, images at the same time on different image capturing dates).

As described above, the image processing apparatus of this embodiment can avoid a plurality of images from being composited in regions corresponding to changes of objects upon generation of an HDR image using a plurality of time-divisionally captured images. For this reason, occurrence of image discontinuity can be avoided.

(Second Embodiment)

The aforementioned first embodiment has explained the case in which as image elements corresponding to moving image elements in an HDR image, image elements of one image, in which the numbers of blown-out highlight and shadow-detail loss image elements are relatively small, of a plurality of differently exposed images are used. Therefore, in the first embodiment, image elements used as those corresponding to moving image elements of an HDR image are extracted from a common image throughout the HDR image. On the other hand, in an image processing apparatus of this embodiment, image elements corresponding to changes of objects are classified into groups, and an optimal exposed image is selected for each group to use image element values of the selected image as image elements of that group upon generation of an HDR image. A method of generating an image whose dynamic range is extended more in this way will be described below.

(HDR Image Generation Processing)

The HDR image generation processing of this embodiment will be described in detail below with reference to the flowchart shown in FIG. 9. Note that in this HDR image generation processing, the same step numbers denote steps in which the same processes as those of the first embodiment are to be executed, and a description thereof will be omitted. Hence, only processes as a characteristic feature of this embodiment will be explained.

After moving image elements are detected in step S303, the controller 101 executes grouping of the moving image elements in step S901. More specifically, the controller 101 executes the grouping mainly based on image coordinate information of corresponding image elements to have luminance values and color information obtained from conversion from a YCC color space as additional information.

The grouping of moving image elements executed in this step will be described below with reference to FIGS. 10A to 10C. For example, when moving image elements detected in step S303 have distributions shown in FIG. 10A, the controller 101 can execute processing associated with the grouping using a region growth method so as to group moving image elements which apply to given conditions.

The region growth method is one of general image processes, which executes grouping to incorporate, based on a certain evaluation value, elements which are initially classified finely (for example, in image element units) when a difference between the evaluation value of a group and that of each element is equal to or smaller than a predetermined threshold value, and not to incorporate them in another case. The region growth method is described in, for example, "Mikio Takagi, Haruhisa Simoda, Handbook of Image Analysis [Revised Edition], University of Tokyo Press".

The region growth method is sequentially executed between adjacent image elements or groups. This method is stopped when a distance defined by outermost shell outer circumferences of respective groups on a line obtained by coupling barycentric coordinates of a given group and those of image elements or another group to be merged becomes equal to or larger than a predetermined threshold. Also, the region growth method is stopped when a difference between an average tone of a given group and that of image elements or another group to be merged becomes equal to or larger than a predetermined threshold. Furthermore, this method may be executed further using another tone information such as information of luminance values and color difference information of level-adjusted exposed images as additional information required to judge whether or not a region is to be grown. Moreover, in order to improve the grouping precision, another image processing method such as annealing may be combined. Using such region growth method, moving image elements detected in step S303 are classified into a plurality of groups, as shown in, for example, FIG. 10B.

When the region growth method is used in the grouping, a result often changes depending on start image elements or a selection order of image elements to be searched. An image element selected as each start image element of the region growth method may be an arbitrary image element determined as a moving image element. However, when start image elements are excessively omitted, a correct region division result cannot be obtained. For example, all image elements determined as moving image elements are selected as start image elements. Whether or not each start element belongs to the same region as a neighboring image element is determined. If it is determined that the start image element belongs to the same region, the neighboring image element is merged to form a region larger than the former region. By repeating this processing, a region division result is obtained. A simplest example as a criterion is a method using a distance between evaluation image elements as a criterion. For example, an evaluation method "to merge, in the same region, image elements to be compared within a neighboring distance range of three pixels" may be used. Thus, by further applying EM (Expectation Maximization) estimation to the grouping results using the region growth method, the influence caused by a selection order of image elements to be searched may be removed.

Note that the EM estimation is processing including a step of calculating an expected value, and a step of updating a value of a random variable, which maximizes a likelihood, using the expected value. In this embodiment, as the expected value, for example, variances of luminance values in a group, distances of image elements from a group barycenter, or an average of distances between individual image elements and their neighboring image elements in a group can be set. By executing the updating processing to increase a likelihood of such expected value, the grouping precision can be improved, so that the respective groups of moving image elements correspond to respective moving objects. The EM estimation is described in, for example, "Kenichi Kanatani, Basic Optimization Mathematics—from Basic Principle to Calculation Method, Kyoritsu Shuppan".

In step S902, the controller 101 extracts, for each of the classified groups, an image, which is used as image elements located at the position of that group upon generation of an HDR image, from the plurality of level-adjusted images stored in the image memory 111 according to equation [1] above. For example, as a result of the processing of this step, different images are selected for respective groups, as shown in FIG. 10C.

In this manner, in generation of an HDR image using a plurality of time-divisionally captured images, a plurality of images can be avoided from being composited in regions corresponding to changes of objects. For this reason, occurrence of image discontinuity is avoided. Furthermore, since an optimal image used in generation of an HDR image can be selected for each moving image element group, an HDR image whose dynamic range is extended more can be generated.

Note that in the description of the HDR image generation processing of this embodiment, in order to further improve grouping reliability by means of the region growth method, motion vectors of objects in moving image elements may be used. Motion vectors can be calculated by selecting two out of the plurality of level-adjusted images stored in the image memory 111 and applying, for example, template matching to the images of the moving image elements detected in step S303. Note that as two images used in the motion vector detection, those which are selected in turn in ascending order of total of the numbers of shadow-detail loss and blown-out highlight image elements or those having lower exposure levels, of the plurality of images stored in the image memory 111.

FIG. 11 is a schematic view for explaining template matching. In FIG. 11, a left stereo image is used as a standard image 1101, and a right stereo image is used as a reference image 1102. A position of an arbitrary moving image element in the standard image 1101 is set as a standard point 1103 used to calculate a corresponding point by template matching, and a region 1104 around the standard point, which is bounded by a square, is set as a detection template. Then, the controller 101 searches the right stereo image 1102 as the reference image for a corresponding point, which corresponds to the template. Assume that a corresponding point search range 1105 is arbitrarily set in the reference image 1102. In this embodiment, as the corresponding point search range 1105, a maximum displacement amount, which is assumed between frames upon capturing two input exposed images, is set. This search range can be limited as much as possible, thus avoiding recognition errors in corresponding point search processing.

Furthermore, the controller 101 calculates a correlation value with the standard point 1103 for each individual corresponding candidate 1106 in the corresponding point search range 1105. The correlation value calculation can be executed by calculating a normal cross-correlation of image element values or a difference sum of image element values in association with the template 1104 and a window region 1107 which is set with respect to the standard point from points around the corresponding point candidate 1106 and has the same size as the template 1104. The controller 101 calculates correlation values for respective corresponding point candidates 1106 included in the search range. Then, the controller 101 selects the corresponding point candidate 1106 having the highest correlation value as a corresponding point, and decides a vector from the standard point toward that corresponding point as a motion vector.

Note that upon execution of the correlation value calculation, when either of image elements corresponding to surrounding image elements included in the template 1104 or the window region 1107 are blown-out highlight or shadow-detail loss image elements, they may be excluded from the correlation calculation.

This embodiment has explained the region growth method to be used in the grouping of moving image elements. However, using other methods, moving image elements may be classified for each region that matches a given condition.

In addition to a method using the grouping method based on position information of moving image elements, in case of a simple layout including isolated objects having largely different luminance levels, for example, a region division result based on threshold processing of histograms without using any position information of each region in grouping may be used. This method is effective for a scene in which luminance levels are clearly different for respective objects. A threshold is decided using a method based on statistical analysis values. Otsu's threshold processing is simple and effective. Also, a plurality of objects can be divided by repeating threshold decision and region division until a statistical distribution of luminance values in a region becomes a natural distribution (for example, a Gaussian distribution) based on the concept of the AIC information criterion (Akaike's Information Criterion: see deLeeuw, J. (1992), "Introduction to Akaike (1973) Information Theory and an Extension of the Maximum Likelihood Principle", Breakthroughs in Statistics Springer Series in Statistics 1992, pp. 599-609). Statistical values of a luminance distribution are applied to a distribution model, and division is recursively repeated during errors are large. Furthermore, since regions of moving image elements including blown-out highlight and shadow-detail loss image elements are readily excessively divided, divisions of high- and low-luminance image element ranges of histograms are refrained. However, this method may be combined to be used in precision enhancement with respect to the grouping result by means of the region growth method using coordinate information of moving image elements.

When color information is input, grouping in a multi-dimensional space associated with the color information (for example, a YUV space having equal scales in association with color differences) may be used. YCC information is converted into YUV color information, and region division is executed by means of histogram processing in multi-dimensions.

The grouping of moving image elements may be executed mainly based on image coordinate information of the image elements to have luminance values and color information obtained by conversion from YCC as additional information. As feature amounts, general image features used in region division or clustering of an image can be used in addition to image coordinates, luminance values, and color information. For example, the grouping precision can be enhanced using multi-dimensional feature amounts such as SIFT features (The Scale Invariant Feature Transform features: see T. Nagahashi, H. Fujiyoshi, T. Kanade, "Object type classification using structure-based feature representation", MVA2007: IAPR Conference on Machine Vision Applications, pp. 142-145, May, 2007.) as sets of local gradient information obtained by pyramiding of an image.

As the grouping method, using as a basis a method based on distance information of moving image elements, an arbitrary general image region division method based on feature amounts such as luminance values (tone values) and color information can be used. Also, the grouping precision may be enhanced based on degrees of overlapping of region boundaries obtained by executing clustering or EM estimation based on the feature amounts, and by applying the region division method to respective exposed images.

In evaluation of degrees of overlapping of region boundaries, unimportant positional deviations of region boundaries are absorbed using expansion or shrinkage of images, pyramiding, or a morphology method, thus evaluating degrees of overlapping of region boundaries. The degrees of overlapping of the region boundaries are evaluated using table comparison or a graph search algorithm based on labels of position coordinates of the region boundaries. When region boundaries in many exposed images overlap each other, the region division result is further divided in more detail based on these boundaries, thus enhancing the grouping precision.

As a general image division method, region division based on a relationship with very adjacent image elements may be executed. For example, region division may be executed by calculating average value shift feature amounts using an average value shift algorithm, and judging regions having identical mode positions as a single group.

Furthermore, feature amounts of local regions may be calculated, and region division may be executed based on those feature amounts. For example, region division may be executed by calculating SIFT feature amounts corresponding to regions, expressing their relationships using graphs, and then executing clustering.

(First Modification)

The aforementioned first and second embodiments have explained the HDR image generation processing in consideration of object image blurs generated during image capturing operations of a plurality of differently exposed images. This modification will explain HDR image generation processing in consideration of the influence of a shake of the digital camera 100 (so-called camera shake), which is generated during image capturing operations of a plurality of differently exposed images, and is caused when the photographer holds the camera.

In the first modification, assume that the digital camera 100 includes an orientation change detector 120, which is configured by, for example, an acceleration sensor or at least one of an acceleration sensor and geomagnetism sensor. The orientation change detector 120 obtains orientation changes of the digital camera 100 during image capturing operations of a plurality of differently exposed images, and informs the controller 101 of the obtained orientation changes. The controller 101 temporarily stores the orientation change information during time-divisional image capturing operations of a plurality of differently exposed images in, for example, the RAM 103.

Then, the controller 101 excludes an image in which an integrated value of the orientation changes detected during exposure is equal to or larger than a threshold of the plurality of differently exposed images when it selects in step S304 an image from which image element values used as image elements corresponding to moving image elements are to be sampled upon generation of an HDR image. Thus, an image, which has suffered an image blur caused by a camera shake of the photographer, of those with long exposure times can be prevented from being assigned to image element values of moving image elements in an HDR image, and a poor HDR image can be avoided from being generated.

Note that in this modification, depending on whether or not the integrated value of orientation changes detected during exposure exceeds the threshold, an image candidate which can be assigned to image element values of moving image elements in an HDR image is changed. However, the present invention is not limited to this. That is, an integrated value of orientation changes during exposure may be calculated for each of the plurality of differently exposed images, and a predetermined number of images in relatively top ranks of the magnitudes of the integrated values may be excluded from selection candidates in step S304.

(Second Modification)

The aforementioned first modification has explained the aspect in which an image which has suffered an image blur caused by a camera shake of the photographer during an exposure time is prevented from being selected as an image from which image elements used as those corresponding to moving image elements are extracted upon generation of an HDR image. The second modification will explain a method which prevents an image that has suffered an image blur caused by a moving amount of an object during an exposure time from being selected as an image from which image elements used as those corresponding to moving image elements are extracted upon generation of an HDR image.

In the second modification, the digital camera 100 includes an object motion detector 130 which detects a motion of each object by obtaining depth information of the object with respect to the digital camera 100 (for example, a binocular stereo camera or Time of Flight camera). More specifically, the object motion detector 130 integrates depth information differences obtained within a time shorter than an exposure time in association with the exposure time, thereby obtaining a motion amount of an object of each of a plurality of differently exposed images.

Then, as in the first modification, the controller 101 excludes an image, in which an object motion amount detected during exposure is equal to or larger than a threshold, of the plurality of differently exposed images when it selects in step S304 an image from which image element values used as image elements corresponding to moving image elements are to be sampled upon generation of an HDR image. Then, since an image which has suffered an image blur caused by movement of an object of those with long exposure times can be prevented from being assigned to image element values of moving image elements in an HDR image, a poor HDR image can be avoided from being generated.

When the digital camera 100 includes a registration function similar to an optical or electronic anti-vibration function or to an anti-vibration function for the purpose of compositing a plurality of images, the object motion detector 130 may decide a motion amount in consideration of correction of that anti-vibration function. More specifically, for example, when the digital camera 100 includes the optical anti-vibration function, the controller 101 transfers shift information of an optical system during the image capturing period to the object motion detector 130 so as to change a depth information obtaining range in synchronism with a field angle range of the digital camera 100.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-082188, filed Apr. 1, 2011, which is hereby incorporated by reference herein in its entirety.

What is claimed is:

1. An image processing apparatus, which comprises a generation unit configured to generate a composite image whose dynamic range is extended using a plurality of differently exposed images, comprising:
   an obtaining unit configured to obtain the plurality of differently exposed images;
   a detection unit configured to detect changes of image element values between the plurality of images;
   a count unit configured to count first image elements of which image element values are larger than a first threshold and second image elements of which image element values are smaller than a second threshold, in a region in which the changes are detected, in each of the plurality of images; and
   a selection unit configured to select one of the plurality of images based on a count result of said count unit, wherein the generation unit uses the image selected by said selection unit for a region, corresponding to the region where the changes are detected, in the composite image.

2. The apparatus according to claim 1, wherein said detection unit comprises:
an adjustment unit configured to adjust tone levels of the plurality of differently exposed images obtained by said obtaining unit,
wherein said detection unit detects changes between the plurality of images based on differences between the plurality of tone level-adjusted images.

3. The apparatus according to claim 1, wherein said selection unit selects an image in which a total of the numbers of first image elements and second image elements counted by said count unit is smallest.

4. The apparatus according to claim 1, wherein said selection unit selects an image having a highest exposure level from images in which a difference between a total of the numbers of first image elements and second image elements counted by said count unit and a smallest value of the total values is not more than a predetermined threshold.

5. The apparatus according to claim 1, wherein said detection unit detects, in association with the plurality of images, image elements corresponding to image element value differences between one standard image and at least one image of the plurality of other images, which differences are not less than a threshold, as image elements corresponding to changes of objects.

6. The apparatus according to claim 1, wherein said detection unit detects, in association with the plurality of images, image elements corresponding to luminance component differences of image element values between one standard image and at least one image of other images of the plurality of images, which differences are not less than a threshold, as image elements corresponding to changes of objects.

7. The apparatus according to claim 1, further comprising an orientation detection unit configured to detect an orientation change of an image capturing apparatus at each of image capturing timings of the plurality of images,
wherein said selection unit does not select an image, in which an orientation change of the image capturing apparatus is not less than a predetermined threshold, of the plurality of images.

8. The apparatus according to claim 1, further comprising a motion detection unit configured to detect a motion amount of an object at each of image capturing period of the plurality of images,
wherein said selection unit does not select an image, in which the motion amount of the object at the image capturing period detected by said motion detection unit is not less than a predetermined threshold, of the plurality of images.

9. The apparatus according to claim 1, wherein the first threshold is larger than the second threshold.

10. An image processing apparatus, which comprises a generation unit configured to generate a composite image whose dynamic range is extended using a plurality of differently exposed images, comprising:
an obtaining unit configured to obtain the plurality of differently exposed images;
a detection unit configured to detect changes of image element values between the plurality of images;
a classifying unit configured to classify image elements corresponding to the detected changes so that neighboring image elements form one group;
a count unit configured to count first image elements of which image element values are larger than a first threshold and second image elements of which image element values are smaller than a second threshold, in association with image elements for each of groups classified by said classifying unit, in each of the plurality of images; and
a selection unit configured to select one of the plurality of images for each of the groups classified by said classifying unit based on count results of said count unit,
wherein the generation unit uses the images selected by said selection unit for image elements, corresponding to image elements in the groups classified by said classifying unit, of the composite image.

11. The apparatus according to claim 10, wherein said detection unit comprises:
an adjustment unit configured to adjust tone levels of the plurality of differently exposed images obtained by said obtaining unit,
wherein said detection unit detects changes between the plurality of images based on differences between the plurality of tone level-adjusted images.

12. The apparatus according to claim 10, wherein said selection unit selects, for each group, an image in which a total of the numbers of first image elements and second image elements counted by said count unit is smallest.

13. The apparatus according to claim 10, wherein said selection unit selects, for each group, an image having a highest exposure level from images in which a difference between a total of the numbers of first image elements and second image elements counted by said count unit and a smallest value of the total values is not more than a predetermined threshold.

14. The apparatus according to claim 10, wherein said classifying unit classifies image elements corresponding to changes of objects using a region growth method.

15. A control method of an image processing apparatus, which comprises a generation unit configured to generate a composite image whose dynamic range is extended using a plurality of differently exposed images, the method comprising:
an obtaining step of obtaining the plurality of differently exposed images;
a detection step of detecting changes of image element values between the plurality of images;
a count step of counting first image elements of which image element values are larger than a first threshold and second image elements of which image element values are smaller than a second threshold, in a region in which the changes are detected, in each of the plurality of images; and
a selection step of selecting one of the plurality of images based on a count result in the count step,
wherein the generation unit uses the image selected in the selection step for a region, corresponding to the region where the changes are detected, in the composite image.

16. A control method of an image processing apparatus, which comprises a generation unit configured to generate a composite image whose dynamic range is extended using a plurality of differently exposed images, the method comprising:
an obtaining step of obtaining the plurality of differently exposed images;
a detection step of detecting changes of image element values between the plurality of images;
a classifying step of classifying image elements corresponding to the detected changes so that neighboring image elements form one group;

a count step of counting first image elements of which image element values are larger than a first threshold and second image elements of which image element values are smaller than a second threshold, in association with image elements for each of groups classified in the classifying step, in each of the plurality of images; and a selection step of selecting one of the plurality of images for each of the groups classified in the classifying step based on count results in the count step, wherein the generation unit uses the images selected in the selection step for image elements, corresponding to image elements in the groups classified in the classifying step, in the composite image.

17. The method according to claim 15, wherein the first threshold is larger than the second threshold.

* * * * *